United States Patent [19]

Seccombe et al.

[11] 3,710,874
[45] Jan. 16, 1973

[54] ELECTRONIC TORQUE MEASUREMENT SYSTEM

[75] Inventors: Robert J. Seccombe, Detroit, Mich.; Paul M. Pyper, Dusseldorf-Lohauser, Germany; Edwin S. Treible, Jr., Ringoes, N.J.

[73] Assignee: Ingersoll-Rand Company, New York, N.Y.

[22] Filed: March 10, 1971

[21] Appl. No.: 122,783

[52] U.S. Cl. .................................173/12, 73/139
[51] Int. Cl. ...........................................B25b 23/14
[58] Field of Search.......................................173/12; 73/136–139

[56] References Cited

UNITED STATES PATENTS

| 1,985,916 | 1/1935 | Coates et al. | 73/139 X |
| 3,538,763 | 11/1970 | Amtsberg et al. | 73/139 X |
| 3,596,718 | 8/1971 | Fish et al. | 173/12 |

Primary Examiner—Ernest R. Purser
Attorney—Frank S. Troidl and David W. Tibbot

[57] ABSTRACT

A wrenching and torque inspection apparatus including a rotary power wrench having its housing fixed to a support by a resilient member forming part of an electronic torque measuring system for measuring the reaction torque load on the wrench housing. The torque measurement signal is used to operate an indicator, such as a light, recorder and may be used to stop the wrench at a predetermined value of torque.

5 Claims, 3 Drawing Figures

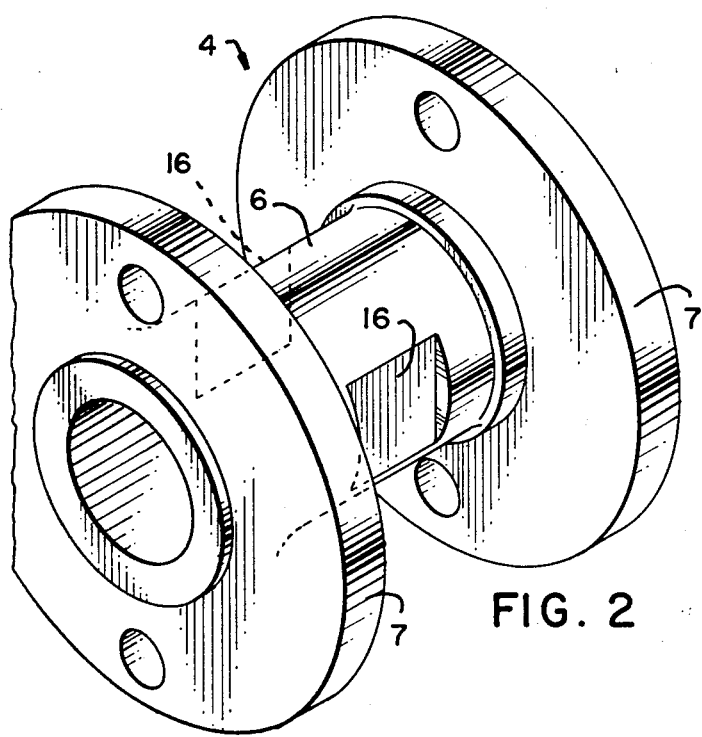
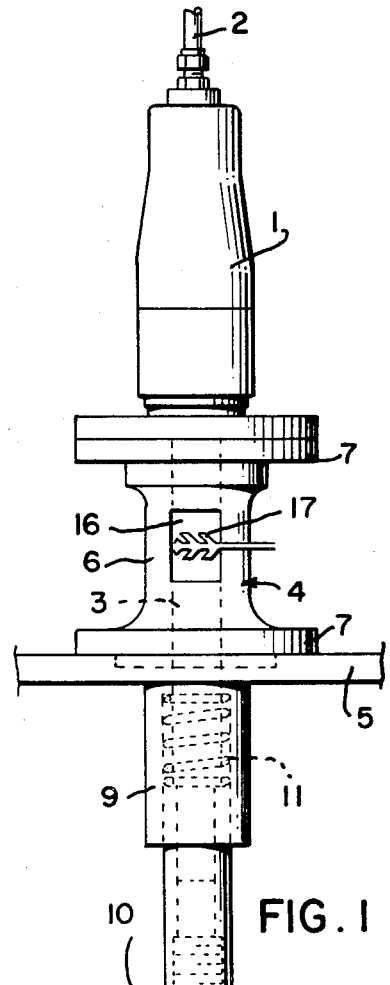
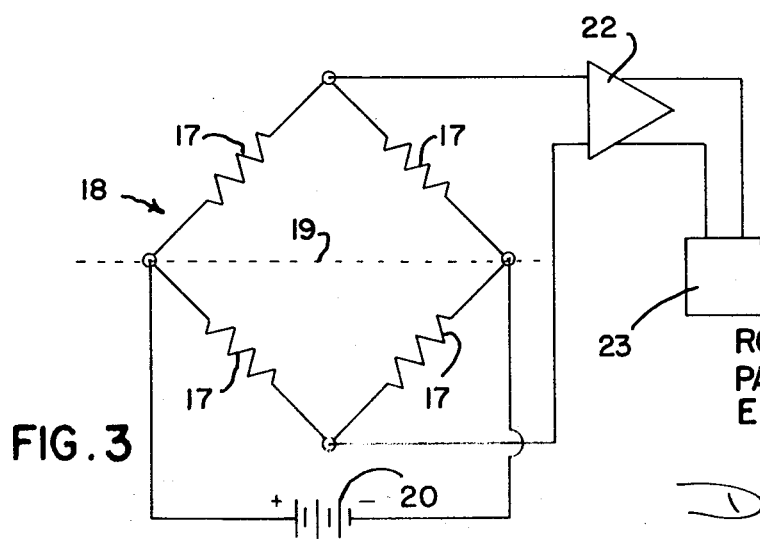
FIG. 2
FIG. 1
FIG. 3
INVENTORS
ROBERT J. SECCOMBE
PAUL M. PYPER
EDWIN S. TREIBLE Jr.
BY
David W. Elliott
ATTORNEY 3,710,874

ELECTRONIC TORQUE MEASUREMENT SYSTEM

BACKGROUND OF THE INVENTION

This invention relates generally to a wrenching or torque inspection apparatus for tightening a fastener to a predetermined torque load and more particularly to an apparatus for electronically measuring the torque load applied to a fastener as it is tightened.

Prior art wrenching or torque inspection systems using electronic systems for measuring torque locate the measuring system on the rotating spindle of the power wrench. A disadvantage of this system is that it requires the use of slip rings or similar devices for conducting the torque signal from the spindle to the signal amplifier and other parts of the system. Slip rings are undesirable because they are expensive, are likely to create trouble and make the wrenching system bulky and awkward to operate.

SUMMARY OF THE INVENTION

The principal object of this invention is to provide an improved and novel wrenching or torque inspection apparatus using an electronic system for measuring the torque applied to a fastener.

Other important objects are: to provide a novel torque inspection apparatus that substantially overcomes or minimizes the foregoing objections to the prior art; to provide a novel torque inspection apparatus that eliminates the use of slip rings for transmitting the torque signal and the problems associated with the use of slip rings; to provide a torque inspection apparatus having an electronic system for measuring the torque load applied to a fastener and having a spindle free of torque measuring means; and to provide a novel wrenching apparatus that measures the torque applied by it to a fastener and controls the apparatus in response to such torque.

In general, the foregoing objects are attained in an apparatus including a rotary power wrench having a housing and a spindle and means for electonically measuring the reaction torque load on said housing during the operation of the wrench and using the electrical signal created thereby to operate an indicator, such as a light, recorder and which may be used to stop the wrench at a predetermined level of torque load.

BRIEF DESCRIPTION OF THE DRAWING

The invention is described in connection with the accompanying drawings wherein:

FIG. 1 is an elevational view of a wrenching apparatus embodying the invention;

FIG. 2 is a perspective view of the reaction torque transducer used in FIG. 1; and FIG. 3 is a schematic view of the electronic torque measuring system.

DESCRIPTION OF THE PREFERRED EMBODIMENT

A conventional air-powered rotary wrench 1 is shown in FIG. 1 connected to a supply hose 2 and having a shaft 3 shown in dotted lines. The front end of the housing of the wrench 1 is fixed to a resilient transducer member 4 attached to a rigid support plate 5. The transducer member 4 is further shown in FIG. 2 and includes an intermediate cylinder 6 having mounting flanges 7 on opposite ends for attaching the member 4 respectively to the wrench 1 and the support plates 5.

A sleeve-like shield 9 is fixed to the lower face of the support plate 5 and surrounds the shaft 3. A lower spindle 10 is slidably keyed on the shaft 3 in a telescoping manner by interengaging splines and flutes and a spring 11 (shown in dotted lines) is housed in the shield 9 and urges the spindle 10 downwardly. A conventional socket 12 is shown attached to the lower end of the spindle 10 and driving a nut 14 in a work surface 15. The telescoping connection of the spindle 10 on the shaft 3 allows the socket 12 to move relative to the wrench 1 as it drives a fastener.

The cylinder 6 of the transducer member 4 is provided with a pair of flats 16 located diametrically opposite each other and electrical strain gauges 17 are mounted on both flats 16. The strain gauges 17 are connected in a wheatstone bridge circuit as shown in FIG. 3. In FIG. 3, in the bridge 18, the dotted line 19 separates the strain gauges 17 mounted on one flat 16 from those mounted on the other flat 16. As is well known in the art of strain gauges, the gauges 17 are mounted at right angles to each other and at 45 degrees to the torsion plane, in this case, a plane perpendicular to the axis of member 4 so that one strain gauge 17 will be in compression when the other is under a tensile stress.

The bridge circuit 18 is energized from a suitable power supply such as a battery 20 connected to the terminals located on the dotted line 19 and the signal created by the bridge 18 is conveyed to an amplifier 22, connected to the other terminals of the bridge 18. The amplified signal from the amplifier 22 can be fed to an indicator or recorder 23 for indicating or recording the torque, or it can be used to operate a shut-off valve (not shown) to stop the wrench 1 from operating when the torque rises to a predetermined value.

We have found that the reaction torque on the wrench housing is equal to the torque on the spindle 10 under all normal conditions of operation of the wrench and, thus, can be used as a measurement of the torque on the wrench spindle 10. By measuring the reaction torque in this manner, we eliminate the problems with slip rings and the like which would be present if we were measuring the torque on the spindle.

We have not attempted to specifically describe the mounting of the strain gauges 17 on the transducer member 4 because we believe that the knowledge of mounting such gauges is old and well known, and, therefore, unnecessary to describe our invention.

While only a single embodiment of the invention is illustrated and described in detail, this invention is not limited merely to this embodiment, but contemplates other embodiments and variations which utilize the concepts and teachings of this invention.

We claim:

1. A power wrenching and torque inspection apparatus comprising:

a power rotary wrench including a housing and a rotary spindle adapted to drive a fastener;

a support for supporting said housing;

a resilient annular member interconnected between said support and said housing, surrounding said spindle, and operative to restrain said housing from moving relative to said support under reaction torque on the housing; and means mounted on said annular member for measuring the reaction torque existing on said housing during the operation of said wrench.

2. The apparatus of claim 1 wherein:

said measuring means includes electronic means for measuring the strain in said resilient member caused by a torque load on said housing.

3. The apparatus of claim 2 wherein:

said electronic means includes an electrical strain gauge reacting to a change in strain in said resilient member and a circuit containing said strain gauge for creating an electrical signal in response to the reaction in said strain gauge.

4. The apparatus of claim 3 including:

shut-off means operative to stop said wrench in response to the rise in torque on said housing to a predetermined torque load.

5. The apparatus of claim 2 wherein:

said resilient member is connected to the forward end of said housing adjacent said spindle.

* * * * *